3,177,117
PROCESS FOR FREEZING BLOOD
Joseph F. Saunders, Springfield, Va., assignor to the United States of America as represented by the Secretary of the Navy
No Drawing. Filed Dec. 26, 1961, Ser. No. 162,296
5 Claims. (Cl. 167—74)
(Granted under Title 35, U.S. Code (1952), sec. 266)

The invention described herein may be manufactured and used by or for the Government of the United States of America for governmental purposes without the payment of any royalties thereon or therefor.

The present invention relates to a chemical substance which is useful for the preservation of human blood. More particularly, the invention refers to a blood additive for donated blood to protect the same during freezing and storing at subzero temperatures and also in thawing such blood prior to transfusions.

The increased demands for readily available blood for use during mass casualties and for storage of rare blood types have resulted in a practical process for stockpiling whole blood by ultra-rapid freezing and storing at subzero temperatures and the subsequent rapid thawing of the preserved blood at a time of need. In order to protect the red blood cells from rigors of freezing and thawing and to prevent cell disintegragtion called hemolysis, it has been found necessary to incorporate preservatives into donated blood prior to processing it for storage. Substances which have been proposed and tried for this purpose include glucose, lactose, sucrose, glycerol and certain polymers, such as dextran and polyvinylpyrrolidone. Although these substances afford adequate protection against hemolysis during the freezing and thawing of blood, their inclusion is preserved blood entails considerable diffculty at the time of transfusion, either by (1) the need for removing these substances before transfusion (2) establishing suitable tolerable limits which can be transfused with the blood or (3) obtaining sufficient clinical evidence to verify the safe use of the preservative even in multiple transfusions.

Clinical observations have indicated that these previous blood preservatives cannot be readily transfused with the preserved blood without untoward clinical effects: Glycerol, for instance, is not suitable for transfusions because of its hypertonicity and, therefore, must be removed by a process referred to as deglycerolization, or the washing away of viscous glycerol, since glycerol in the amounts needed for protection cannot be transfused with the preserved blood. Lactose has an apparent toxicity, especially in multiple transfusions, which precludes its acceptance clinically. The polymers, dextran and particularly polyvinylpyrrolidone, present the problem of tissue retention, depending on the molecular weight of the polymers. Moreover, the use of higher molecular weight polymers which have been tried as detoxifying agents have resulted in contradictory clinical observations and further use has been cautioned. Glucose and other hexose carbohydrates upset the osmotic balance and permeate the cell membrane thus rendering the red blood cells osmotically susceptible to destruction (hemolysis).

Heretofore, an all-purpose blood additive, one that can protect the blood during a preservation process which includes steps of rapidly freezing and thawing and which may then be transfused with the reconstituted blood to provide beneficial effects in vivo, has not been available. An ideal blood additive as contemplated herein should afford protection in processing whole blood for storage without disrupting the chemical integrity and morphology of the red cells; it should also be metabolically inert and preferably provide some beneficial biological activity after it has been transfused with the blood.

Therefore, it is an object of this invention to provide a protective substance which is added to whole blood in processing it for storage in order to prevent the destruction of red blood cells.

It is another object of the invention to provide an improved process for the preservation of whole blood involving rapid freezing and thawing without injury to the erythrocytes.

A further object of the invention is to provide a blood additive that can be readily transfused with whole blood to provide beneficial physiological functions.

A still further object of the invention is to provide a protective substance which effectively prevents hemolysis of blood during a storing procedure and which is also retained in the blood during transfusions.

These and other objects are achieved as a result of the present invention in which a blood preservation process for storing whole blood can be effectively achieved by including a protective substance in the blood to provide effective protection against hemolysis. The inclusion of mannitol into donated blood which is to be processed for storage protects the red blood cells during the rapid freezing step which immobilizes them in accordance with the invention. Blood containing mannitol in amounts up to 25 percent by weight per unit volume is frozen rapidly to subzero temperature of −196° C. and maintained in the frozen state during the storage period at temperatures of −170° C. or lower. The mannitol does not permeate the red blood cell, as occurs with the hexoes, as for example with glucose; consequently, mannitol does not enter the glycolytic pathway that occurs in the red blood cell and therefore is not metabolized. Mannitol moreover, serves as an extracellular additive that modifies the physical environment surrounding the cells without disrupting the chemical integrity and morphology of the cell. Furthermore, the presence of mannitol in the frozen, stored blood affords further protection during the rapid thawing step that restores the preserved blood to normal conditions suitable for transfusions. Advantageously, mannitol can be transfused with the blood, and it assumes in the patient beneficial physiologic functions without any adverse clinical effects. Mannitol dissociates from the cell in vivo and assumes such functions as temporary blood volume expander, osmotic diuresis, binding of free hemoglobin, etc.

In practising the invention, blood from donors is immediately prepared with an anticoagulant, such as the acidified citrate dextrose (ACD) which is added to the fresh blood by any of the special mechanical devices currently in use for collecting and adding the anticoagulant. Mannitol U.S.P. is then added to the acidified-citrate-dextrose blood in an amount sufficient to obtain about a 15% to 25% mannitol solution. The mannitol is mixed thoroughly into solution, and the ACD-mannitol blood is immediately processed for storage. It is frozen at liquid nitrogen temperatures to about −196° C. at a rate of about 3 degrees temperature drop per secon. The freezing step from about room temperature to about −196° C. is accomplished in approximately one minute. Rapid freezing in a mannitol solution prevents fragmentation of the red blood cells through physical force, for instance, through ice crystal formations.

Frozen blood prepared in this manner may be stockpiled for future use, which may involve years of storage, at temperatures of between −170° C. and −196° C., maintained by liquid nitrogen. The preserved blood is then thawed at a time of emergency or for any special requirement. Thawing is accomplished rapidly at about 3 to 5 degrees temperature rise per second in a hot water bath maintained at 45° C. ±1° C. Rapid thawing at the critical hot water bath temperature indicated enables the blood to assume normal physiological conditions that are essential for a transfusion. Thawed blood can still be stored at blood bank temperatures for at least ten additional days prior to transfusion.

Many of the disadvantages attributed to the carbohydrates and their derivatives, which in the past have served as blood preservatives, are due to osmotic and similar changes which burst the cell membrane allowing the enclosed hemoglobin to escape into the surrounding fluid. Mannitol, however, remains in the extracellular space and does not permeate the cell.

While detailed clinical procedures will not be presented, the clinical effects of mannitolized blood which is used directly in transfusions will be presented along with clinical studies involving the use of mannitol in vivo. Clinical studies have proved the mannitol is not toxic and need not be removed from transfused blood, as was the case with many previous blood additives. Mannitol has been tested clinically as an osmotic diuretic. Mannitol infusion has been recommended in the therapy of oliguric states and in the prevention of acute functional renal failure during resection of aneurisms of the aorta. It is also used in relieving refractory and acute fluid retention. Consequently, the clinical behavior of mannitol is presently well known.

Blood transfusions containing mannitol in 15% to 25% by weight based on total volume of blood will promote an osmotic diuresis, the mannitol being freely filtered across the glomerulus into the lumen of the renal tubule. Urinary excretion of mannitol particles with their obligatory water constitutes an osmotic diuresis. Many patients requiring blood transfusions will be directly benefited by an increased urine flow. In any situation where naphrotoxic substances might be present, the dilution of such substances can be effectively promoted by rapid excretion of water and mannitol in the urine. It has been experimentally shown that the combination of hemoglobinemia, renal ischemia and antidiuresis in dogs results in renal damage. This damage, however, was prevented when osmotic diuresis was established by the administration of mannitol.

Transfusions of blood containing mannitol also find considerable usage in traumatic cases because of post-operative sodium retention, a condition in which the patient is conserving sodium at a time when no intake is available. If fluid replacement is necessary to maintain blood pressure and blood volume, there are considerable difficulties when the organism begins to mobilize edema fluid for this purpose and because of sodium retention is unable to excrete water. An osmotic diuretic such as mannitol is found to be considerably useful for this purpose.

In clinical tests, infusions of 100 grams of mannitol per 500 ml. of fluid results in acute renal excretions because the mannitol is filtered out and is not reabsorbed from the tubular lumen in the kidney. Further experiments indicate that mannitol infusion causes an acute increase in plasma volume; the condition, however, is transient and does not minimize the overall beneficial effects of mannitolization. Even with patients who were in precarious cardiopulmonary condition, the infusion of mannitol showed no evidence of circulatory overload or other deleterious effects in over 50 trials.

In extensively burned patients with hemoglobinuria, permanent renal damage and anuria are averted by the induction of a solute diuresis with mannitol. It is explained that the induction of a solute diuresis exerts its effects by increasing the distal tubule urinary flow and by reducing urinary concentration, thus permitting the excretion of toxic products of blood destruction without renal damage. In contrast, it has been shown that hypertonic solutions, such as glucose, causes an increase in renal blood flow accompanied by an increase in cardiac output and circulating blood volume. Mannitol which has the same particle size as glucose, is limited to the extracellular space and is not reabsorbed nor metabolized. Mannitol, therefore, has many therapeutic effects in vivo, and its inclusion in transfused blood is of considerable value.

A further embodiment in the use of the present blood additive resides in the combination of mannitol as the high constituent in concentrations of 15 to 25 percent based on weight of final volume with another blood preservative in substantially lower concentrations. Glucose and sucrose, for example, may be combined in concentrations of about 3–5% by weight based on final volume. Such combinations of mannitol and a hexose carbohydrate provides an extracellular blood additive with an intracellular blood additive in an amount that would not cause lysis.

Another combination of blood additives involves the use of a polymer, such as polyvinylpyrrolidone or dextran in low concentrations of about 3–5% by weight and of lower molecular weight which is not subject to tissue retention. Polyvinylpyrrolidone is considered sufficiently safe in molecular weights of less than 15,000.

A further combination of blood additives, utilizes mannitol with a soluble mannitol derivative, for example, mannitol monoacetate which has greater solubility than free mannitol. The monoacetate provides enhanced solubility for the desired mannitol concentration. The mannitol is included in concentrations of about 20%, while the monoacetate may be included in concentrations as high as 15% by weight based on final volume.

Chemically, the mannitol molecule has six functional hydroxyl groups and is capable of extensive hydrogen bond formation with water and other substances. It should theoretically form bonds with electronegative particles, for example, with water oxygen, and with electropositive particles, for example, hydrogen and nitrogen, on the surface of the erythrocyte, thus encapsulating the cell. These chemical properties are highly desirable since they indicate that the substance will not enter the erythrocyte and become metabolized. Moreover, its ability to bond prevents influx and efflux of water, thereby controlling massive crystal formations on the exterior surface of the cell which could destroy the cell by external pressure.

In summary, mannitol in accordance with the present invention, is an all-purpose blood additive capable of protecting the blood during freezing, storing and thawing; it is also suitable as a blood additive in transfusions. It is not toxic and has proved to be a potentially safe and effective diuretic. In blood transfusions, it averts hemolysis and also mobilizes and binds free hemoglobin that may be present prior to or following transfusion.

Obviously many modifications and variations of the present invention are possible in the light of the above teachings. It is therefore to be understood that within the scope of the appended claims, the invention may be practised otherwise than as specifically described.

What is claimed is:

1. A process of freezing blood containing an anticoagulant which comprises adding thereto and thoroughly mixing therewith an amount of mannitol to form a resulting blood solution which contains from about 15 to 25% by weight of mannitol, and subjecting the resulting blood solution to rapid freezing down to a temperature of about −196° C.

2. A process of freezing blood containing acidified citrate dextrose which comprises adding thereto and thoroughly mixing therewith an amount of mannitol to form a resulting blood solution which contains from about 15 to 25% by weight of mannitol, and subjecting the resulting blood solution to rapid freezing down to a temperature of about −196° C.

3. A process of freezing and storing blood containing acidified citrate dextrose which comprises adding thereto and thoroughly mixing therewith an amount of mannitol to form a resulting blood solution which contains from about 15 to 25% by weight of mannitol, subjecting the resulting blood solution to rapid freezing down to a temperature of about −196° C. and storing the frozen blood solution at a temperature between about −170° C. and −196° C.

4. A process of freezing blood containing an anticoagulant which comprises adding thereto and thoroughly mixing therewith an amount of mannitol and of a member of the group consisting of glucose, sucrose, dextran and polyvinylpyrrolidone to form a resulting blood solution which contains from about 15 to 25% by weight of mannitol and from about 3 to 5% by weight of a member of the aforesaid group, and subjecting the resulting blood solution to rapid freezing down to a temperature of about −196° C.

5. A process of freezing blood containing an anticoagulant which comprises adding thereto and thoroughly mixing therewith an amount of mannitol and of mannitol monoacetate to form a resulting blood solution which contains from about 15 to 25% by weight of mannitol and from about 3 to 20% by weight of mannitol monoacetate, and subjecting the resulting blood solution to rapid freezing down to a temperature of about −196° C.

References Cited by the Examiner

Bender: Chem. Abst., vol. 54, p. 21292(b), 1960.
Chem. Abst., vol. 54, 1960, p. 2498(d).
Delaney: Chem. Abst., vol. 54, p. 16514(b), 1960.
Kawano: Chem. Abst., vol. 53, p. 5502(i), 1959.
Lesser: Drug and Cosmetic Industry, vol. 75, No. 1, July 1954, p. 32.
Loutit: J. of Path. and Bacter., vol. 57, pp. 325–327, 1945.
Loutit: Quarterly J. of Exptl. Physiol., vol. 32, p. 183, 1943.
Meryman: Research Report, Project NM–000–018.01.01, Naval Medical Research Institute, National Naval Medical Center, Bethesda, Maryland, Dec. 19, 1955, pp. 953–964.
Mikhnovich: Chem. Abst., vol. 53, p. 14204(i), 1959.
Wintrobe: Clinical Hematology, Lea and Febiger Co., 1949, p. 310.

JULIAN S. LEVITT, *Primary Examiner.*

MORRIS O. WOLK, LEWIS GOTTS, *Examiners.*